US008274507B2

(12) United States Patent
Becker et al.

(10) Patent No.: US 8,274,507 B2
(45) Date of Patent: Sep. 25, 2012

(54) METHOD AND APPARATUS FOR OBTAINING 3-DIMENSIONAL DATA WITH A PORTABLE DEVICE

(75) Inventors: Jan Becker, Palo Alto, CA (US); Soeren Kammel, San Jose, CA (US); Benjamin Pitzer, Menlo Park, CA (US); Badri Raghunathan, San Jose, CA (US)

(73) Assignee: Robert Bosch GmbH, Stuttgart (DE)

( * ) Notice: Subject to any disclaimer, the term of this patent is extended or adjusted under 35 U.S.C. 154(b) by 603 days.

(21) Appl. No.: 12/497,089

(22) Filed: Jul. 2, 2009

(65) Prior Publication Data

US 2011/0001983 A1   Jan. 6, 2011

(51) Int. Cl.
*G06T 15/00* (2011.01)
(52) U.S. Cl. ....... 345/419; 345/428; 345/619; 356/5.01; 356/5.02; 356/5.1; 356/28.5; 382/103; 382/104; 382/106; 382/110
(58) Field of Classification Search .................. 345/419, 345/428, 619; 356/5.01, 5.02, 5.1, 28.5; 700/253, 269; 382/103, 104, 106, 110
See application file for complete search history.

(56) References Cited

U.S. PATENT DOCUMENTS

| 6,147,760 | A | 11/2000 | Geng |
| 6,885,464 | B1 | 4/2005 | Pfeiffer et al. |
| 7,092,563 | B2 | 8/2006 | Shiratani |
| 7,206,063 | B2 | 4/2007 | Anderson et al. |
| 7,916,898 | B2 * | 3/2011 | Anderson ............... 382/104 |
| 8,059,263 | B2 * | 11/2011 | Haberer et al. ......... 356/5.01 |
| 2008/0004525 | A1 | 1/2008 | Goldman et al. |
| 2008/0037090 | A1 | 2/2008 | Miller et al. |
| 2009/0156232 | A1 | 6/2009 | Benco et al. |

FOREIGN PATENT DOCUMENTS

| DE | 19608632 A1 | 9/1997 |
| DE | 202007007861 U1 | 8/2007 |
| EP | 1221582 A2 | 7/2002 |
| WO | 2004036246 A1 | 4/2004 |
| WO | 2005067389 A2 | 7/2005 |

OTHER PUBLICATIONS

Biber, et al., First Experiences with a Mobile Platform for Flexible 3D Model Acquisition in Indoor and Outdoor Environments—the Wagele, University of Tubingen, Tubingen, Germany, undated, (8 pages).

(Continued)

*Primary Examiner* — Phu K Nguyen
(74) *Attorney, Agent, or Firm* — Maginot, Moore & Beck

(57) ABSTRACT

In one embodiment, a three dimensional imaging system includes a portable housing configured to be carried by a user, microelectrical mechanical system (MEMS) projector supported by the housing sensor supported by the housing and configured to detect signals emitted by the MEMS projector, a memory including program instructions for generating an encoded signal with the MEMS projector, emitting the encoded signal, detecting the emitted signal after the emitted signal is reflected by a body, associating the detected signal with the emitted signal, comparing the detected signal with the associated emitted signal, determining an x-axis dimension, a y-axis dimension, and a z-axis dimension of the body based upon the comparison, and storing the determined x-axis dimension, y-axis dimension, and z-axis dimension of the body, and a processor operably connected to the memory, to the sensor, and to the MEMS projector for executing the program instructions.

12 Claims, 4 Drawing Sheets

OTHER PUBLICATIONS

Psuedo Video Sequence Coding of Integral Imaging based 3D Images, available at http://apachepersonal.miun.se/~rogols/research/Coding.htm, Jan. 9, 2009 (4 pages).

Best Manufacuring Practices Center of Excellence, p. 11 of a Report of Survey Conducted at Applied Research Laboratory, Pennsylvania State University State College, PA, undated, (2 pages).

RSI GmbH, Rexcan III professional High-End 3D Scanner, available at http://www.rsi-gmbh.de/public/en/prod/Hard/Rexcan_III.html, Jan. 9, 2009 (4 pages).

Mittuniversitetet 3D and ROI Video Coding, Synthesis of integral imaging based 3D-images and 3D-video, available at htttps://www.miun.se/ITM/Forskning/Informations—och-kommunikations-system/MUCOM/..., Jan. 9, 2009, (3 pages).

Zhang, High Resolution, Real-time 3-D Shape Measurement, PhD Dissertation, May 2005, Harvard University.

Pico Projector Displays, available at http://www.microvision.com/pico_projector_displays, Jan. 1, 2009 (1 page).

International Search Report in corresponding PCT application (i.e., PCT/2010/040364) mailed Oct. 29, 2010 (4 pages).

\* cited by examiner

METHOD AND APPARATUS FOR OBTAINING 3-DIMENSIONAL DATA WITH A PORTABLE DEVICE

FIELD OF THE INVENTION

The present invention relates generally to portable devices and more particularly to portable devices incorporating microelectrical mechanical systems (MEMS).

BACKGROUND OF THE INVENTION

Three-dimensional (3-D) models of objects can provide information useful for a variety of applications such as generating computer aided design models from physical objects, planning and visualizing architectural structures, and planning and visualizing interior and exterior design features. The creation of a 3-D model of either an object, a structure, or a scene, however, can require the involvement of highly skilled professionals with extensive artistic knowledge, expensive modeling equipment and time intensive efforts.

Various approaches to simplifying the generation a 3-D model of an object or scene have evolved. One common approach incorporates a triangulation system. A triangulation system projects beams of light onto an object, typically using a LASER. The emitted light is then reflected off the object at an angle relative to the light source and an imaging component which is spaced apart from the light source collects the reflection information. Based upon an association of the emitted beam and the reflected beam, the system then determines the coordinates of the point or points of reflection by triangulation. A single dot system projects a single beam of light which, when reflected, produces a single dot of reflection. A scanning line system sends a plane of light against the object, the plane of light is reflected as a curvilinear-shaped set of points describing one contour line of the object. The location of each point in that curvilinear set of points can be determined by triangulation.

Another commonly used 3D modeling approach is a stereoscopic system employing one or more imaging systems located at known locations or distances from each other to take multiple images of a 3D object. The captured images are processed with a pattern recognition system that relates the various points of the object in the multiple images and triangulates to extract depth information of these points, thereby obtaining the shape/contour information of the 3D object.

The systems described above are costly, bulky, and may require substantial knowledge to operate. Accordingly, while providing sufficient data to produce an accurate 3-D model, the usefulness of the systems is limited. Various coding schemes have been developed to allow a fewer number of images to be used in generating sufficient data for generating a 3D model. One such coding scheme uses binary codes like the Gray code to produce only one-to-one correspondences between projector and camera coordinates. This approach is costly (in the sense of projection quality and measuring time) since high resolution patterns are needed to achieve desired spatial resolution.

Another coding scheme incorporates one dimensional discrete Fourier transforms (DFT). One-dimensional DFT phase demodulation requires the projected ID fringes to be aligned with the camera. Accordingly, the depth range of the system is limited and susceptible to errors when incorporated into a non-fixed system. Two-dimensional DFT phase demodulation systems similarly suffer from high depth ranges. In principle, the direction of the spectral components needed to retrieve the desired phase information in a two-dimensional DFT phase demodulation system can be determined. The automated design of a suited frequency filter is, however, complicated and rather slow.

Another class of coding techniques are Moiré techniques which are based on the interference of two patterns. Moiré techniques require high carrier frequencies and are therefore sensitive to focal blur. This interference can be generated optically or within a computing system. Optical interference can be mitigated by incorporation of an alignment procedure using a reference grid or, if using the discrete structure of the camera sensor itself, by incorporating a costly system calibration. Computing system interference is mitigated using a signal analysis that is similar to DFT phase demodulation, and which suffers the same shortcomings as the DFT phase demodulation schemes.

What is needed is a system that can be used to generate data required to create a 3-D model of an object or scene. A system which is portable and capable of obtaining the required data using an easily implemented coding scheme would be beneficial.

SUMMARY OF THE INVENTION

In one embodiment, a three dimensional imaging system includes a portable housing configured to be carried by a user, microelectrical mechanical system (MEMS) projector supported by the housing sensor supported by the housing and configured to detect signals emitted by the MEMS projector, a memory including program instructions for generating an encoded signal with the MEMS projector, emitting the encoded signal, detecting the emitted signal after the emitted signal is reflected by a body, associating the detected signal with the emitted signal, comparing the detected signal with the associated emitted signal, determining an x-axis dimension, a y-axis dimension, and a z-axis dimension of the body based upon the comparison, and storing the determined x-axis dimension, y-axis dimension, and z-axis dimension of the body, and a processor operably connected to the memory, to the sensor, and to the MEMS projector for executing the program instructions.

In a further embodiment, a method of generating a three dimensional model includes generating an encoded signal with a microelectrical mechanical system (MEMS) projector supported by a portable housing, emitting the encoded signal, reflecting the encoded signal off of a body, detecting the reflected signal with a sensor supported by the housing, associating the detected signal with the emitted signal using a processor located within the housing, comparing the detected signal with the associated emitted signal, determining an x-axis dimension, a y-axis dimension, and a z-axis dimension of the body based upon the comparison, storing the determined x-axis dimension, y-axis dimension, and z-axis dimension of the body, and rendering a depiction of the body using the stored x-axis dimension, y-axis dimension, and z-axis dimension of the body.

In yet another embodiment, a three dimensional imaging device includes a housing sized to be borne by a user, the housing defining a projector port extending therethrough and a detector port extending therethrough, a microelectrical mechanical system (MEMS) projector within the housing and positioned to emit an encoded signal through the projector port, a sensor within the housing and configured to detect signals through the projector port, a memory including program instructions for generating an encoded signal with the MEMS projector, associating a signal detected with the sensor to the emitted signal, comparing the detected signal with the associated emitted signal, determining an x-axis dimension, a y-axis dimension, and a z-axis dimension of the body based upon the comparison, and storing the determined x-axis dimension, y-axis dimension, and z-axis dimension of the body, and a processor operably connected to the memory, to the sensor, and to the MEMS projector for executing the program instructions.

The above described features and advantages, as well as others, will become more readily apparent to those of ordinary skill in the art by reference to the following detailed description and accompanying drawings.

DETAILED DESCRIPTION

Figure 2:
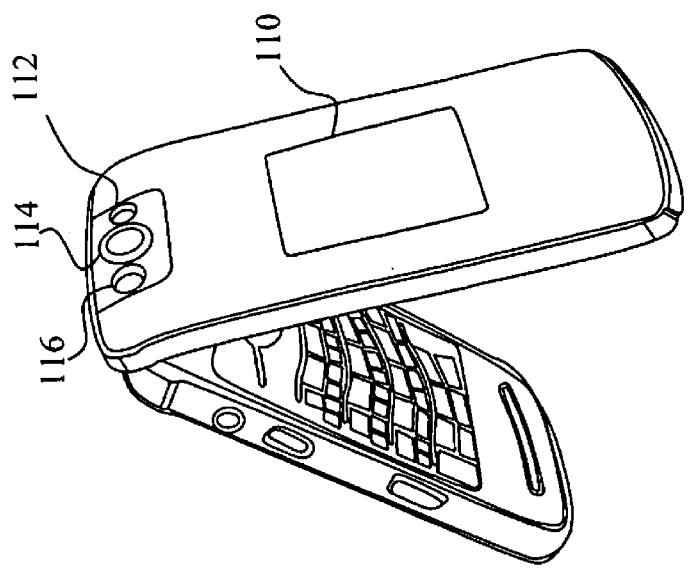
FIGS. 1 and 2 depict perspective views of a portable device in which the subject invention may be used.
Figure 1:
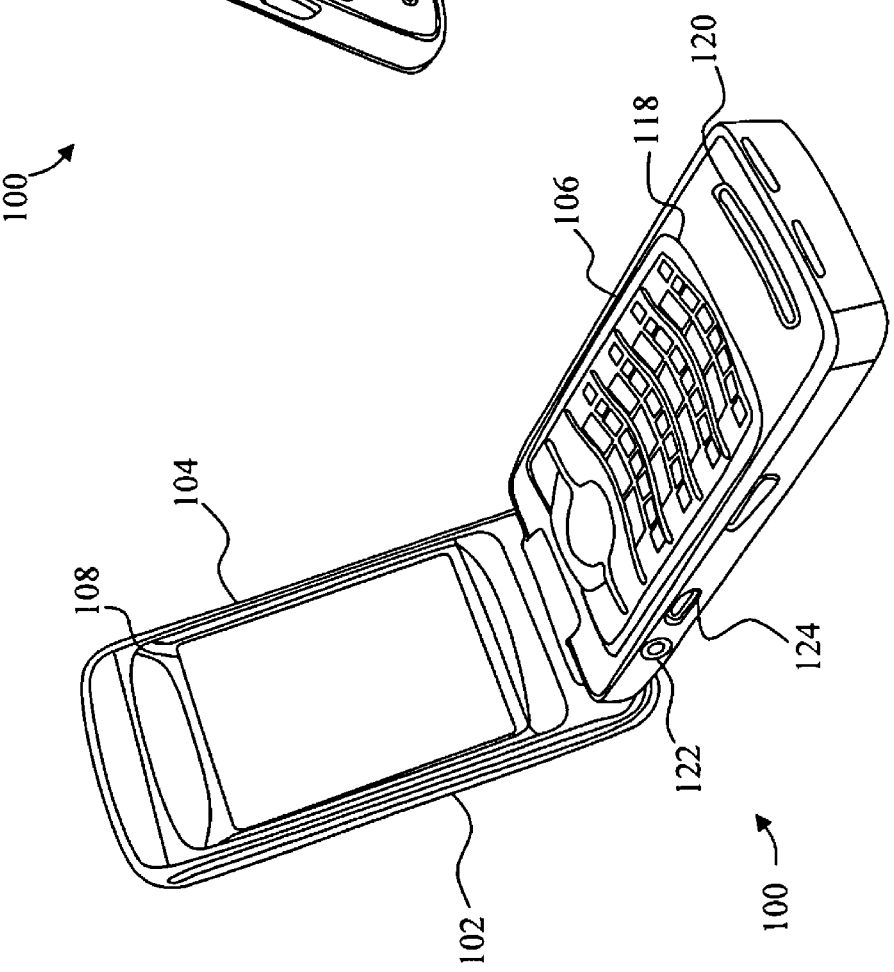

Referring to FIG. 1, there is depicted a portable device, generally designated 100, which in this embodiment is a cellular telephone. The portable device 100 has a housing 102 that includes an upper housing 104 and a lower housing 106. An inner display 108 is located on the inner side of the upper housing 104 and an outer display 110 is located on the outer side of the upper housing 106 as depicted in FIG. 2. The outer side of the upper housing 104 further includes a projector port 112, a camera port 114 and a light port 116.

Referring again to FIG. 1, the lower housing 106 includes a keyboard 118 and a microphone port 120. A data port 122 and a charging port 124 are located on the side of the lower housing 106.

Figure 3:
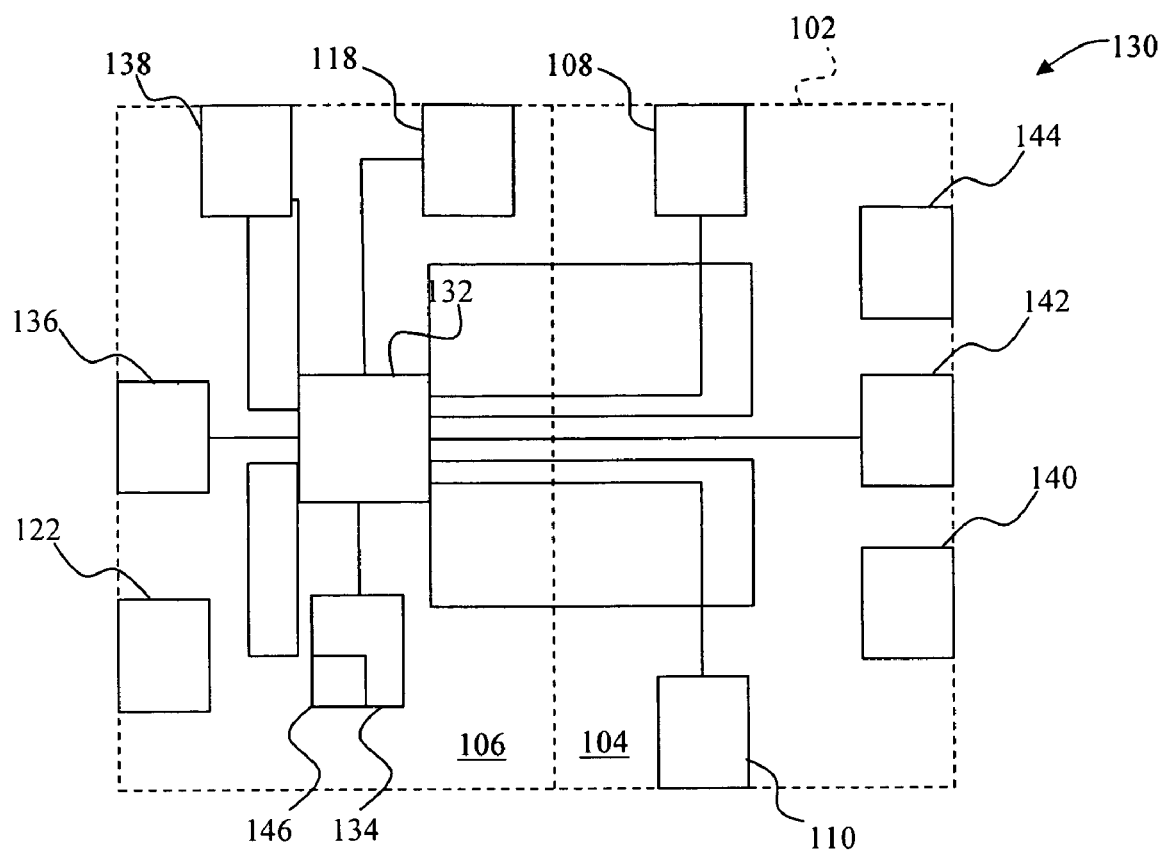
FIG. 3 depicts a block diagram of the components of the portable device of FIG. 1.

FIG. 3 depicts a control circuit 130 which is located within the housing 102. The control circuit 130 includes a processor 132 and a memory 134 which in this embodiment are located within the lower housing 106. The processor 132 is operably connected to the keyboard 118 and the data port 122. The processor 132 is further operably connected to a power source 136 which is accessed through the charging port 124 and a microphone 138 positioned adjacent to the microphone port 120.

The processor 132 is also operably connected to components in the upper hosing 104 including the inner display 108 and the outer display 110. The processor 132 is further operably connected to a microelectrical mechanical system (MEMS) projector 140, a charge coupling device (CCD) 142 and a light 144 which are physically located adjacent to the projector port 112, the camera port 114 and the light port 116, respectively.

The MEMS projector 140 may suitably be a MEMS based projector as disclosed in U.S. Patent Publication No. 2008/0037090, published on Feb. 14, 2008, the entire contents of which are herein incorporated by reference. The MEMS projector 140 in one embodiment includes a number of light sources, such as lasers, and control circuitry which can be used to modulate the light emitted by the MEMS projector 140.

Within the memory 134 are stored program instructions 146. The program instructions 146, which are described more fully below, are executable by the processor 132 and/or any other components as appropriate. The program instructions 146 include commands which, when executed by the processor 132, cause the portable device 100 to obtain data for use in constructing a three dimensional model of a scene within the view of the CCD 142.

Figure 4:
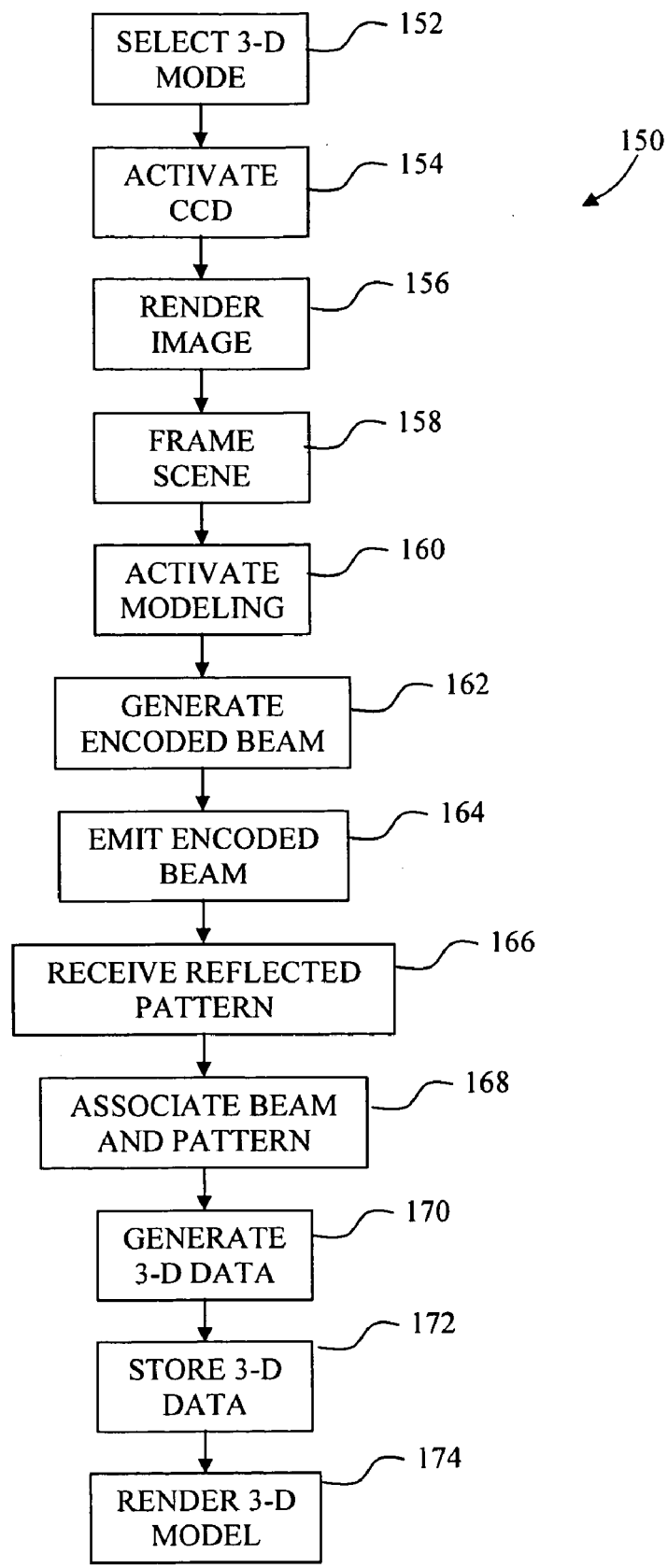
FIG. 4 depicts a procedure for obtaining data for constructing a 3-D model using the portable device of FIGS. 1 and 2.

Referring to FIG. 4, there is depicted a flowchart, generally designated 150, setting forth an exemplary manner of obtaining data for use in constructing a three dimensional model according to the present principles. Initially, a user carrying the portable device 100 opens the housing 102 to the position shown in FIG. 1 and uses the keyboard 118 to place the portable device 100 in 3-D mode (block 152). In embodiments which are configured solely for obtaining 3-D images, the device may only need to be energized. In embodiments such as the portable device 100, the display 108 may be controlled to render a menu which the user can use to activate the 3-D mode.

Once the portable device 100 is placed in 3-D mode, the processor 132 controls the CCD 142 to an energized condition (block 154). In response, the CCD 142 begins to detect incoming energy in any acceptable manner and generates a signal indicative of the sensed energy. The processor 132 receives the generated signal and controls the inner display 108 to render the scene viewed (sensed) by the CCD 142 (block 156).

Using the rendered image as a guide, the user frames the desired scene/object (block 158) and activates 3-D data acquisition (block 160) such as by pressing a key in the keyboard 118. In response, the processor 132 controls the MEMS projector 140 to generate an encoded signal (block 162). Program instructions for generating the encoded signal may be stored as program instructions 146 in the memory 134. Additional discussion of the coding is provided below.

Returning to the flowchart 150, the encoded beam is then emitted from the portable device 100 (block 164). As the encoded beam encounters surfaces in the scene framed by the user (see above at block 158), each portion of the beam which encounters a surface is reflected. Some amount of the reflected beam portions are reflected in a direction toward the CCD 142. Because the emitted beam was encoded, the reflected beams will be in the form of a pattern that is a function of the encoded beam and the particular surfaces which reflected the encoded beam.

The CCD 142 receives the reflected patterns (block 166) and generates a signal representative of the reflected patterns. The processor 132 receives the output from the CCD and stores the output, along with data associated with the emitted beam, in the memory 134. The processor 132 processes the stored output data and emitted beam data and associates the stored output data with the emitted beam that was reflected by the surfaces.

Once associated data is available, data needed to render a 3-D model may be generated. The 3-D data is then stored in the memory 134 (block 172). When desired, the user may control the portable device 100 to render a 3-D image based upon the stored 3-D data.

A number of alternative approaches may be used to generate the coded signal. One approach using color coding to obtain 3-D data for a model is disclosed in U.S. Pat. No. 6,147,760, issued on Nov. 14, 2000, the disclosure of which is herein incorporated by reference. In another approach, the associated data may be used to determine parallax between the emitted beam and the received pattern caused by the spatial offset between the MEMS projector 140 and the CCD 142. The parallax is obtained by applying a phase shifting triangulation method which uses sinusoidal fringe patterns. In other approaches, the coding scheme may be a color coding scheme, a spatial coding scheme, or an advanced time series coding scheme.

One approach incorporates phase shifting methods. With a carefully chosen decoding and phase unwrapping method, high quality measurement results can be achieved. Minimizing the phase steps in phase shifting methods is desirable in non-fixed systems to provide rapid data acquisition. The minimum number of phase steps is offered by the well-known "three bucket algorithm."

The three bucket algorithm, however, is susceptible to first order harmonics as are introduced by non-ideal sinusoidal patterns produce, for example, by non Lambertian light reflection. Therefore, use of the three bucket algorithm in non-laboratory applications typically results in harmonic distortions of the patterns due to arbitrary movements of the camera. A 4-bucket phase decoding algorithm may be used to reduce the impact of the harmonic distortions.

Phase shifting algorithms are inherently limited to providing values within the range of one period of the sinusoidal patterns incorporated in the system. This limitation may be mitigated by incorporation of a phase unwrapping algorithm. Algorithms that unwrap the phase information without further measurements usually assume smooth (continuous) surfaces and phase ambiguities caused by discontinuities and noise cannot be resolved in every case.

When incorporated in a mobile system, however, assumptions on the measurement constellation cannot be made. Therefore, the phase unwrapping in one approach is performed incorporating information obtained from additional measurements. Specifically, a second phase image is calculated using a period length different to the period used during the first measurement. The phase may then be unwrapped from the two wrapped phase images using the Chinese remainder theorem (Nonius principle).

The Nonius principle may produce unsatisfactory results since the underlying integer arithmetic requires low-noise images as well as nearly ideal sinusoidal patterns which are usually not achievable with conventional optical devices. An alternative to the Nonius principle is to iteratively refine the phase values starting with a coarse period. Then, the period of the sinusoidal patterns are reduced until the desired measurement accuracy has been reached. The starting period in this alternative approach is selected to be large enough to cover the entire measuring (encoding) range. The starting period thus provides a coarse estimate of the phase values without phase jumps. Subsequently, a second phase image is calculated using a fraction of the starting period length and is then unwrapped using the first phase image.

A number of variations may be made to the procedure 150. By way of example, association of a beam with a pattern (block 168) may be controlled by a processor other than the processor 132. In one modification, the stored output data and emitted beam data is transferred to a remote device, either using a wireless communications system or by using the data port 124. The remote device may then associate the reflected patterns with the emitted beams to generate 3-D data.

Accordingly, a portable device such as the device 100 may be used, for example, by a craftsman to obtain a large volume of data for a project. Such data may be 3-D data regarding an area in which bookshelves, a window seat, or other "built-in" projects, are to be built. The 3-D data may be used to ascertain the proper amount of materials needed as well as to develop alternative designs for a customer to consider.

The portable device 100 may further be used to generate computer assisted design (CAD) models for use by architects and interior designers. The ability to rapidly generate 3-D data enables a model to be more correct both geometrically and photometrically. The increased ease of obtaining and inputting data allows an enriched and more realistic model to be produced with less time and effort. The same advantages may be realized when surveying an undeveloped outdoor area for a future project.

The portable device 100 further allows range data to be obtained. Accordingly, captured scenes, even those captured in 2-D, can be tagged with metadata specifying the relevant depth information. The addition of range data to a 2-D file allows an image to be rendered in 3-D form or to be manipulated for measurements of various data.

Figure 5:
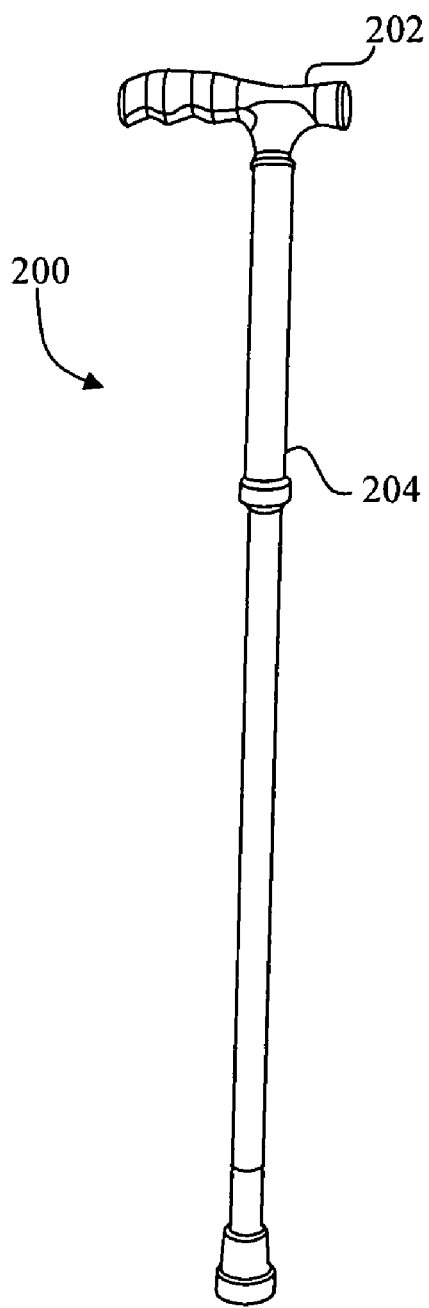
FIGS. 5 and 6 depict a perspective and partial plan view of an alternative embodiment of a portable device in which the subject invention may be used.
Figure 6:
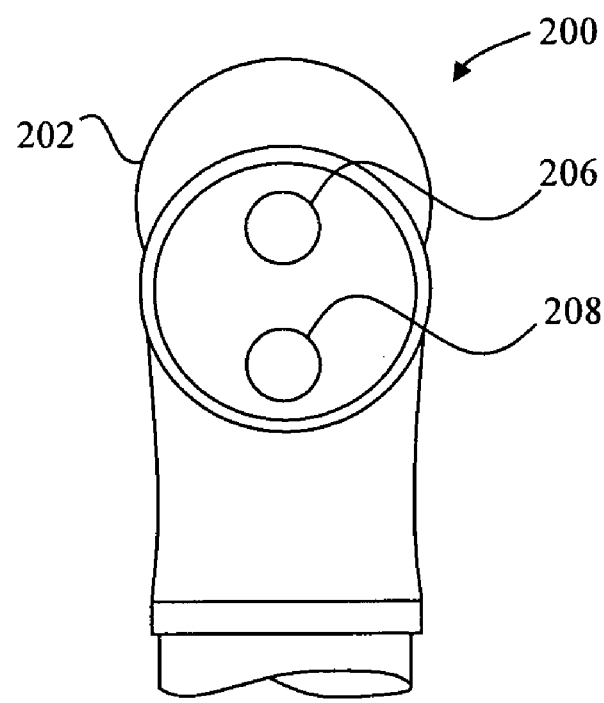

The 3-D data may be used in applications other than visual rendering. By way of example, a cane 200 is depicted in FIG. 5. The cane 200, which includes a grip 202 and a shaft 204, may be used to provide support for an individual with limited sight. The grip 202 includes a CCD 206 and a MEMS projector 208 which operate in substantially the same manner as the MEMS projector 140 and the CCD 142 of the portable device 100. Rather than rendering a 3-D image, however, the cane 200 may be configured to provide audio or tactile data to a user, providing an indication as to the range and bearing of an obstruction or change in terrain.

Thus, the foregoing processes may be modified in a number of ways within the scope of the invention. Accordingly, while this invention has been described as having a preferred design, the subject invention can be further modified within the spirit and scope of this disclosure. This application is therefore intended to cover any variations, uses, or adaptations of the subject invention using its general principles. Further, this application is intended to cover such departures from the present disclosure as come within known or customary practice in the art to which this invention pertains and that fall within the limits of the appended claims.

We claim:
1. A three dimensional imaging system comprising:
a portable housing configured to be carried by a user, the portable housing comprising a cellular telephone housing defining a projector port and a camera port;
a microelectrical mechanical system (MEMS) projector supported by the housing and positioned to project signals through the projector port;
a sensor supported by the housing and configured to detect incoming energy received through the camera port;
a memory supported by the housing including program instructions for generating an encoded signal with the MEMS projector,
activating the MEMS projector to emit the encoded signal through the projector port,
activating the sensor to detect the emitted signal after the emitted signal is reflected by a body,
associating the detected signal with the emitted signal,
comparing the detected signal with the associated emitted signal,
determining an x-axis dimension, a y-axis dimension, and a z-axis dimension of the body based upon the comparison, and
storing the determined x-axis dimension, y-axis dimension, and z-axis dimension of the body; and
a processor operably connected to the memory, to the sensor, and to the MEMS projector for executing the program instructions.

2. The system of claim 1, the memory further including program instructions for determining a distance between the sensor and the body.

3. The system of claim 1, wherein determining the x-axis dimension, the y-axis dimension, and the z-axis dimension of the body comprises:
   using a sinusoidal fringe pattern to quantify a parallax between the sensor and the MEMS projector with respect to the body.

4. The system of claim 3, wherein generating an encoded signal with the MEMS projector comprises:
   generating a color encoded signal with the MEMS projector.

5. The system of claim 3, wherein generating an encoded signal with the MEMS projector comprises:
   generating a spatially encoded signal with the MEMS projector.

6. The system of claim 3, wherein generating an encoded signal with the MEMS projector comprises:
   generating a time series encoded signal with the MEMS projector.

7. A method of generating a three dimensional model comprising:
   generating an encoded signal with a microelectrical mechanical system (MEMS) projector supported by a portable cellular telephone housing;
   emitting the encoded signal through a projector port in the portable cellular phone housing toward a body;
   detecting the encoded signal reflected off of the body with a sensor supported by the cellular telephone housing;
   associating the detected signal with the emitted signal using a processor located within the cellular telephone housing;
   comparing the detected signal with the associated emitted signal;
   determining an x-axis dimension, a y-axis dimension, and a z-axis dimension of the body based upon the comparison;
   storing the determined x-axis dimension, y-axis dimension, and z-axis dimension of the body in a memory; and
   rendering a depiction of the body using the stored x-axis dimension, y-axis dimension, and z-axis dimension of the body.

8. The method of claim 7, further including;
   determining a distance between the sensor and the body using a processor located within the housing.

9. The method of claim 7, wherein determining the x-axis dimension, the y-axis dimension, and the z-axis dimension of the body comprises:
   using a sinusoidal fringe pattern to quantify a parallax between the sensor and the MEMS projector with respect to the body.

10. The method of claim 9, wherein generating an encoded signal with the MEMS projector comprises:
    generating a color encoded signal with the MEMS projector.

11. The method of claim 9, wherein generating an encoded signal with the MEMS projector comprises:
    generating a spatially encoded signal with the MEMS projector.

12. The method of claim 9, wherein generating an encoded signal with the MEMS projector comprises:
    generating a time series encoded signal with the MEMS projector.

* * * * *